(12) United States Patent
Vinther

(10) Patent No.: US 7,990,673 B2
(45) Date of Patent: Aug. 2, 2011

(54) SAFETY LOOP FOR A LIGHT FIXTURE

(75) Inventor: Thomas Vinther, Beder (DK)

(73) Assignee: Martin Professional A/S, Aarhus N (DK)

( * ) Notice: Subject to any disclaimer, the term of this patent is extended or adjusted under 35 U.S.C. 154(b) by 285 days.

(21) Appl. No.: 12/107,833

(22) Filed: Apr. 23, 2008

(65) Prior Publication Data
US 2009/0230892 A1    Sep. 17, 2009

(30) Foreign Application Priority Data
Mar. 17, 2008  (DK) ................................. 2008 00410

(51) Int. Cl.
*H02H 5/04* (2006.01)
(52) U.S. Cl. ........................................ 361/103; 315/309
(58) Field of Classification Search ..................... 315/74, 315/299, 308, 309; 361/103, 105
See application file for complete search history.

(56) References Cited

U.S. PATENT DOCUMENTS

| | | | |
|---|---|---|---|
| 4,150,887 A | 4/1979 | Huber | |
| 4,536,817 A * | 8/1985 | Pejouhy | 361/105 |
| 4,675,777 A * | 6/1987 | Watrous | 361/106 |
| 4,713,721 A | 12/1987 | Pelonis | |
| 5,077,645 A | 12/1991 | Habinak | |
| 5,978,196 A | 11/1999 | O'Boyle | |
| 6,349,023 B1 * | 2/2002 | Greenberg | 361/103 |
| 7,372,210 B2 | 5/2008 | Scolaro et al. | |
| 7,595,595 B2 * | 9/2009 | Mehta | 315/291 |
| 7,605,549 B2 * | 10/2009 | Mehta et al. | 315/307 |
| 7,737,640 B2 * | 6/2010 | Marques et al. | 315/86 |
| 2009/0033235 A1 * | 2/2009 | Mehta | 315/194 |

FOREIGN PATENT DOCUMENTS

EP   1 577 918 A2   9/2005
WO   93/01640 A1    1/1993

* cited by examiner

*Primary Examiner* — Thuy Vinh Tran
(74) *Attorney, Agent, or Firm* — Roberts Mlotkowski Safran & Cole, P.C.; David S. Safran

(57) ABSTRACT

A light fixture and a method for control of a light fixture is supervised by at least one thermoswitch which protects the light source by disconnecting the power supply to the light source at elevated temperature. To achieve a safety circuit in a light fixture without switching the supply circuit to a light source, the at least one thermoswitch is connected to a low voltage safety loop, which safety loop is connected to a current source that generates a constant current in the safety loop. The safety loop is supervised by a current measuring device. Hereby, it is achieved that the switching, if temperature rises, is achieved by switching contacts that only carry a very limited current. This will increase the life time of the thermoswitch and very small switches can be used.

10 Claims, 3 Drawing Sheets

SAFETY LOOP FOR A LIGHT FIXTURE

BACKGROUND OF THE INVENTION

1. Field of the Invention

The present invention relates to a light fixture comprising at least one light source, which light source is eclectically connected to an ignition circuit, which ignition circuit is further connected to a power unit, which power unit comprises an electronic ballast, which lamp is supervised by at least one thermo switch, which thermo switch by increasing temperature protects the light source by disconnecting the power supply to the light source.

The present invention further relates to a method for temperature supervision of a light fixture, in which light fixture a beam of light is generated by at least one light source, in which light fixture a number of blowing units generates airflow for cooling the light fixture, in which light fixture thermo sensors detect the temperature.

2. Description of Related Art

U.S. Pat. No. 5,978,196 concerns a thermal protection system for use with a lighting fixture includes a temperature-sensitive switch responsive to the ambient temperature which may have a rating less than that of the lamp. The temperature-sensitive switch controls the operation of a suitably higher rated control device connected to the lamp to turn the lamp off when the ambient temperature above the thermal switch exceeds a predetermined level.

U.S. Pat. No. 4,713,721 describes a two-terminal A.C. device is described which can be series connected with a lighting fixture to prevent overheating of the fixture in an overload condition, namely, when a lighting element exceeding the power rating of the fixture is installed. In broad terms, the device includes a bidirectional, self-extinguishing switch which can be triggered to conduct current between the two terminals of the device, and control circuitry operable from the voltage difference and current between the two terminals occurring in use to regulate the triggering of the switch. The control circuitry includes triggering circuitry which generates triggering signals from the voltage difference across the terminals of the device and normally applies the triggering signals to the control terminal to permit a predetermined measure of conduction. In an overload condition detection circuitry detects an overload current and activates trigger signal suppressing circuitry which temporarily suppresses the application of triggering signals to the switch thereby reducing the mean level of the current delivered to the fixture in an overload condition. In an overload condition, the lighting fixture is operated in a dim or intermittent fashion thereby indicating the overload condition to the user.

SUMMARY OF THE INVENTION

It is the object of the invention to achieve a safety circuit in a light fixture without switching the supply circuit to a light source. A further object of the invention is to switch of the power supply in situations where temperature in a light fixture has reached a safety level.

This can be achieve in a light fixture as described in the preamble to claim 1 if further modified by using at least one thermo switch, which can be connected to a low voltage safety loop, which safety loop can be connected to a current source that generates a constant current in the safety loop, which safety loop is supervised by current measuring device.

Hereby it is achieved that the switching, if temperature arises, is achieved by switching contacts that are only carrying a very limited current. This will increase the life time of the thermo switch and very small switches can be used. The necessary current for a current loop can be very limited, a few mA are sufficient for supervising a number of switches. By using series of small switches they can be placed on critical positions in a light fixture. If a number of switches should have been used by using previous known thermo switches, all switches have to switch the high current as well as a high voltage that is supplied to a lamp. Therefore, using a current loop for thermo detection is reducing the cost of producing a light fixture but also the reliability of the light fixture is increasing, as traditional thermo switches only are able to switch a few times before they have to be exchanged.

In a preferred embodiment for the invention the safety loop can comprise at least one mechanically operated safety switch. It is also impossible to use other switches, which are part of the same serial connection of switches. In this way, can a cover, which gives access to the lamp, for example be supervised in a way where opening that cover automatically switches off the power supply to the lamp. Other mechanical switches could also be placed so that as soon as a service man tries to get access of the inner of a light fixture, one switch will be activated and an automatic switching off of the power supply to the lamp can be achieved.

In a possible embodiment for the invention the safety loop can be connected to the power unit, which power unit can generate and supervise a constant current in the safety loop, which power unit disconnect the light source if the current in the safety loop is interrupted. By connecting the current loop directly to the power supply, it is possible to switch off an existing switch directly at the power supply and in this way disconnect the power supply to the light source. By letting the safety loop go directly from the head through the yoke and to the power supply placed in the base, there will be a direct connection. Only if connectors are correctly in position, the current loop will be established and only if the current loop is correctly connected; it will be possible to switch on the light source. As the current safety loop will work immediately there will be no delay, which could occur if a command should be send as a computer signal transmitted over a data bus from the head towards a controller placed in the base where the controller sends a command to the power supply to interrupt the supply to the light source.

It is preferred that the safety loop comprises a number of thermo switches coupled serial in the safety loop. As already mentioned, other mechanical switches could be part of the safety loop and also a number of thermo switches can be part of the same safety loop. These extra thermo switches could in fact be placed somewhere else in a light fixture where critical temperature might occur. It could be highly effective to switch off the light source before other components somewhere in the light fixture are damaged by increasing temperature.

The thermo switches can be placed in the head in relation to the cooling of the light source. By placing thermo switches where cooling is very important, it is possible to use the safety switch where for example a ventilator is stopped so that the total power consumption in a moving head light fixture can be reduced immediately.

At least one of the thermo switches can be placed heat conductively to heat sensitive components placed near or in the light path of the light fixture. If there is no room for directly placing the thermo switch at a very warm component, it is possible to place the thermo switch in thermal conductive relation to a component or a volume that has to be supervised.

In a preferred embodiment for the invention the first part of the safety loop comprising the thermo switches are connected to a light source in a moving head, where the safety loop is further connected through a power distribution joke to the power unit, which power unit comprises a current generator, and a current supervision circuit, which power unit disconnect the power to the light source if the current in the safety loop is interrupted. By placing all active components for the current safety loop in the power supply in the base, it is achieved that only wiring through connectors are necessary up to the thermo switches placed in the head. Because the supervision takes place directly from the power supply a very fast response can be achieved.

By a method as described in the preamble to claim 8 can be achieved by using a least one thermo sensor which is supervised by a low voltage current loop, which current is generated by current generating means, which current loop is supervised by current detection means, where the current detection means are communicating with at least one power switch for interrupting the power supply to the light source. By using the current loop, the size of the thermo switches can be reduced. By using smaller and cheaper thermo switches it is probably possible to place a higher number of thermo switches in a light fixture and in this way achieve a better and more effective thermal supervision of critical components.

The current loop can be generated and supervised from a power unit, which power unit disconnect at least the light source when temperature failures are indicated. In this way, a number of mechanical components can also be supervised. That could for example be cover for the light socket or it could be any other mechanical cover in the light fixture. That could lead into a situation where each time a cover is opened; the light source is switched of.

It is preferred that the safety loop forms a serial loop of low voltage thermo switches and at least one safety switch. A number of other safety supervisions are possible by using the low voltage current loop.

DETAILED DESCRIPTION OF THE INVENTION

Figure 1:
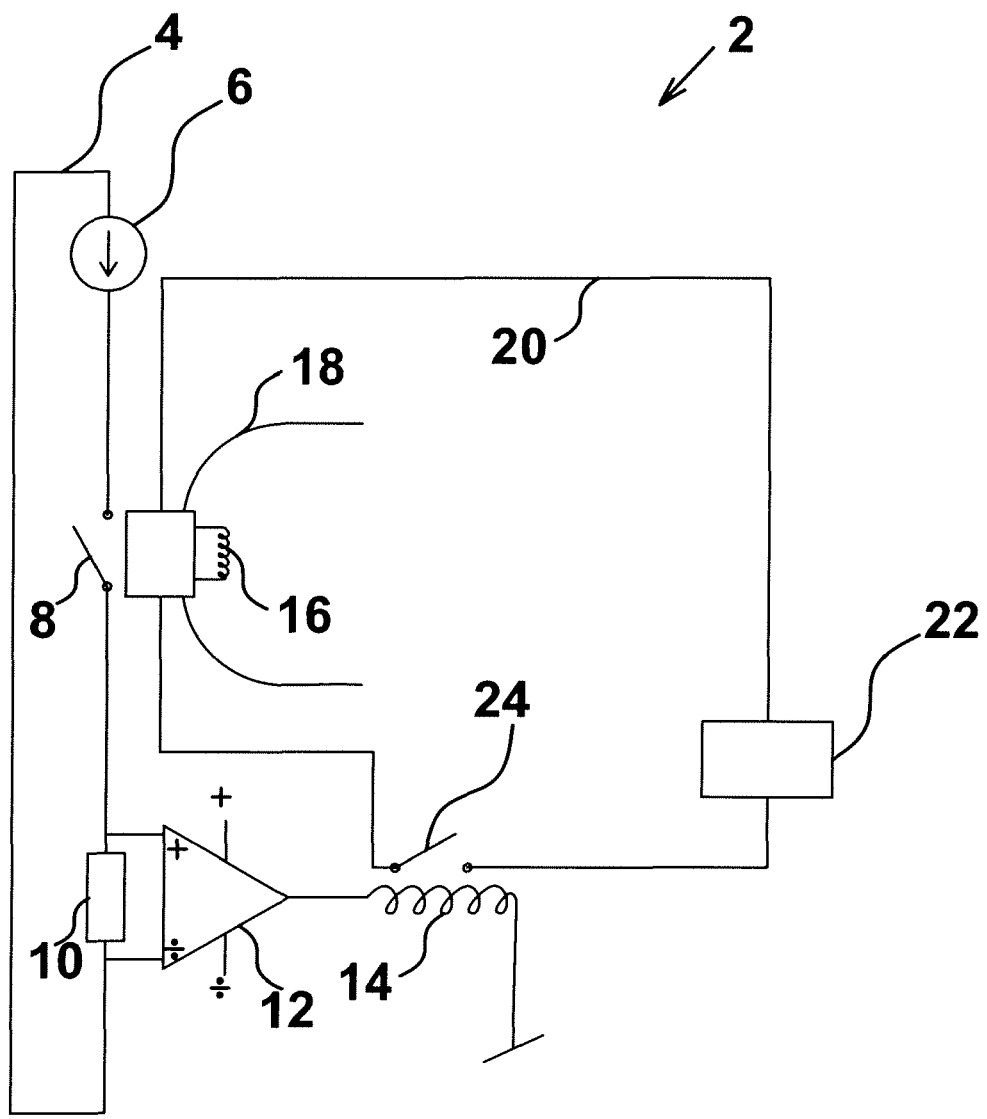
FIG. 1 shows a first possible embodiment for the invention.

FIG. 1 shows a first possible embodiment for the invention. In FIG. 1 is shown an electric circuit 2 in a light fixture. This electric circuit 2 comprises a current safety loop 4, which is generated by a current generator 6, where the current loop is connected through a thermo switch 8, which is shown open, and which current loop 4 further is connected to a resistor 10, which is used for measuring the current. The resistor 10 is connected to an operational amplifier 12 from both sides, which amplifies the voltage that is occurring over the resistor 10. The operational amplifier 12, which probably also comprises power amplifying is connected to a coil 14, which probably is part of a relay, which relay has a power switch 24. The light source 16 is placed in a reflector 18 and the light source 16 is supplied through a line 20 from a power supply 22 and where the line from the power supply 22 to the lamp 16 passes through the already mentioned switch 24. In operation, the thermo switch 8 will be closed and the switch 24 will also be closed. In that situation the light source 16 will be in operation. If the temperature in the light source increases, the thermo switch 8 will open. This will interrupt the current in the safety loop 4 and the voltage drop across the resistor 10 will decrease rapidly. This change in voltage is amplified in the operational amplifier 12 and current starts flowing through the coil 14, which is opening the switch 24 and hereby disconnects the light source 16.

Figure 2:
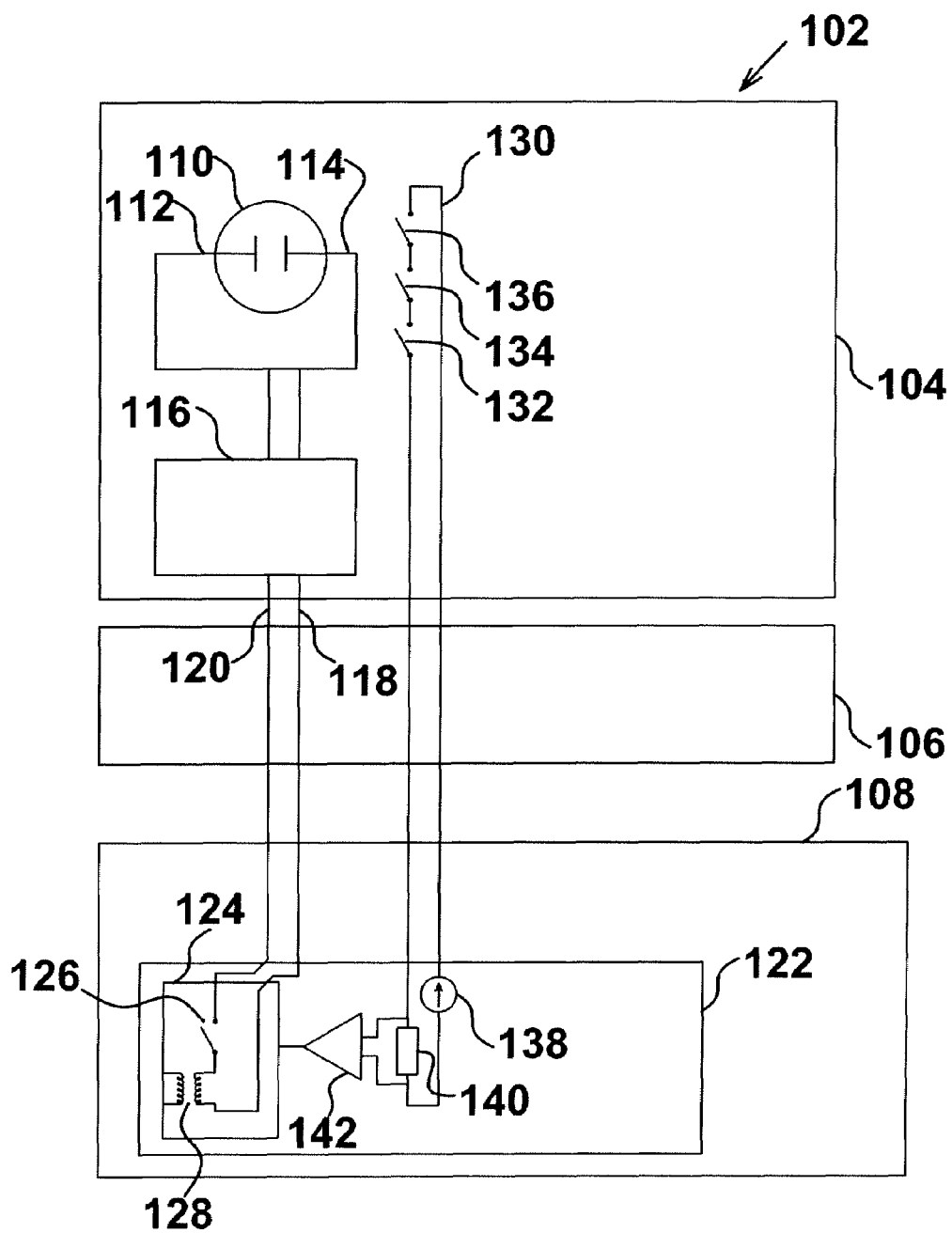
FIG. 2 shows an alternative embodiment for the invention.

FIG. 2 shows an alternative embodiment for the invention. A schematic diagram of a light fixture 102 comprises a head 104 a yoke 106 and a base 108. The head comprises a light source 110, which light source is connected through connection lines 112 and 114. These lines 112 and 114 are connected to an ignition circuit 116 from which power lines 118 and 120 are connecting through the yoke 106 towards the base 108 and into the power supply 122. The power supply 124 comprises a main switch 126 and a transformer 128. The safety loop 130 comprises thermo switches 132, 134 and 136. The safety loop is connected from the head through the yoke 106 and to the base 108 where a current source 138 is shown. A current measuring resistor 140 and an operational amplifier 142 are also indicated. The operational amplifier 142 is opening the switch 126 if the current loop is disconnected.

In operation, the constant current will flow through the safety loop 130 and as long as the switches 132, 134, 136 are closed the current will flow and the voltage drop across the resistor 140 will be relatively high. If one of the switches 132, 134, 136 is opened, no current can flow in the loop 130 and the voltage drop across the resistor 140 will be reduced to near zero. This can activate the amplifier 142 for opening the switch 126. By letting the current loop be connected directly to the power supply, existing switching means in the power supply can be used for disconnecting the power supply to the light source.

Figure 3:
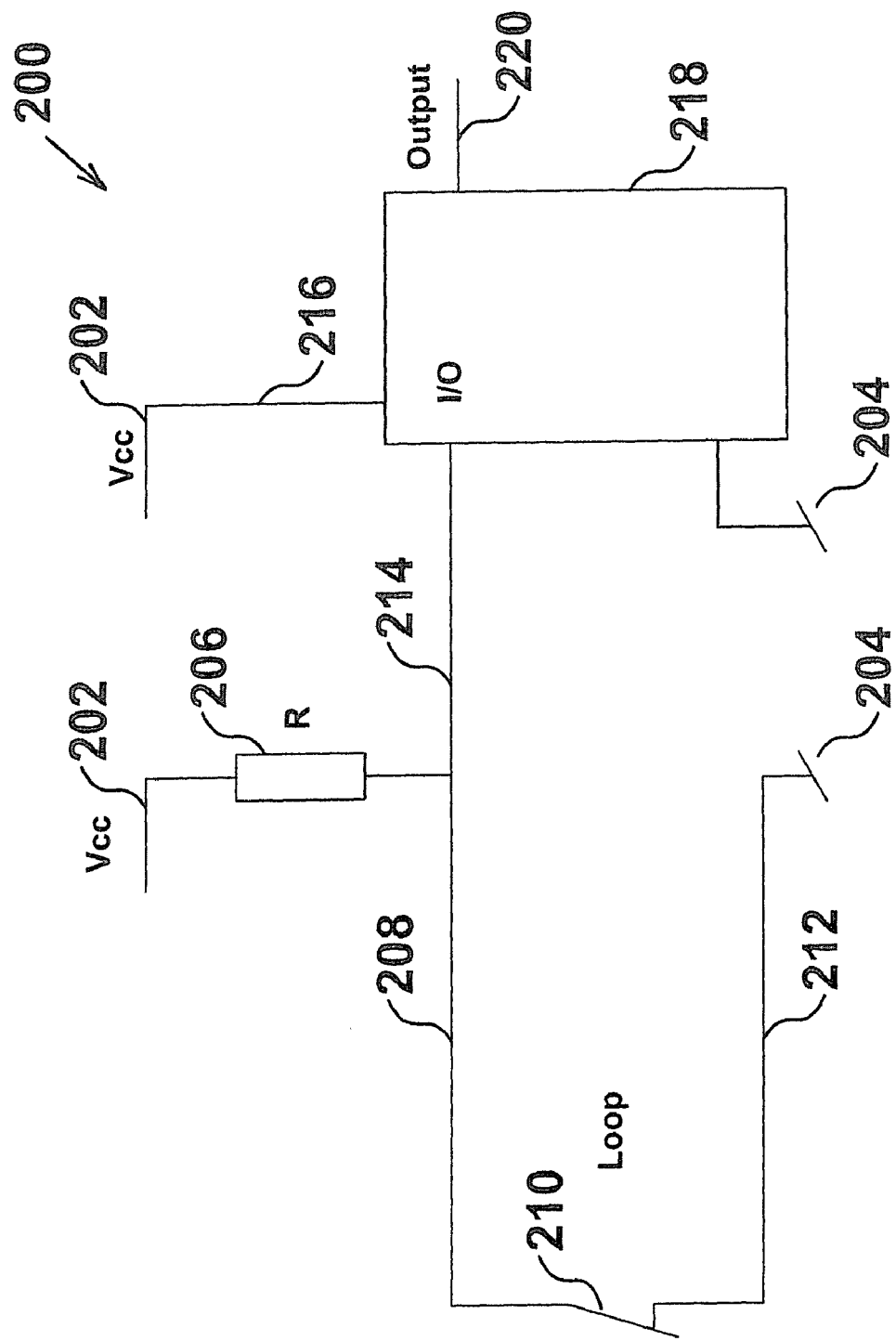
FIG. 3 shows an alternative circuit for use in a light fixture.

FIG. 3 shows an alternative circuit for use in a light fixture. A circuit 200 has two connections to power supply 202 and two connections to ground 204. A resistor 206 is connected to the power supply 202. This resistor is further connected to line 208 and 214. The line 208 connects to a temperature switch 210. From this temperature switch, line 212 connects to ground 204. The line 214 coming from resistor 206 leads towards a detection circuit 218. The detector circuit 218 is further connected to line 216 to the power supply 202. The detector circuit is further connected to the ground 204. The detector circuit 218 has an output 220.

In an alternative embodiment, it is possible to achieve mostly the same effect by using two axles which are interconnected by the same belt but where wheels on the rotating axles have different diameters. Instead of letting toothed wheels in intermesh, it is possible to connect the wheels by, e.g., a belt. In another embodiment, where space maybe not sufficient, it is possible at an existing belt connected from a driving motor to a rotating element somewhere there is sufficient room to get in contact with that belt to use a wheel that is rotating a magnetic detector. Placing two of these detecting elements along the same belt and letting the wheels that have been driven by the belt having a different diameters, it is possible to achieve that effect that the magnetic detectors will deliver signals having different frequencies. It is to be understood that each detector could deliver a sinus signal. When two sinus signals having different frequency are compared very long time differences can occur before the same position of both sinus curves are achieved. Therefore rotating of the wheels can be performed for several rotations and there will still be a total position indication.

In operation, the safety switch 210 is closed in the position as shown, wherein current flows from the power supply 202 through the resistor 206 and through the line 208, through the safety switch 210, through line 212 to the ground 204. In this situation, the voltage drop across the resistor 206 is the full voltage measured between power supply and ground. Thus, the line 214 has the ground voltage. This ground voltage is then detected by the detector 218, and the detector can send a logical zero at the output terminal 220.

In a situation where e.g. increasing temperature occurs inside a light fixture, the safety switch 210 will open. In that case, no current flows to the line 208, and the voltage at terminal 214, the input to the detector, is immediately increasing to the power supply level as measured at 202. This leads the detector 218 to switch for sending a logical one at the output terminal 220. This logical output one can be an input to a processor which then transmits the information about increasing temperature to a system controller which then can switch off the power supply to the light source.

The detector 218 can be different analog/digital converters such as smith triggers which have the necessary function of switching the digital output if an analogue input value is changed. A number of different analog amplifying circuits could be used for achieving exactly the same function.

What is claimed is:

1. A light fixture comprising at least one light source, which light source is electrically connected to a power unit, which power unit comprises an electronic ballast, which light source is supervised by at least one thermoswitch, which thermoswitch, with increasing temperature, protects the light source by disconnecting the power unit to the light source, wherein the at least one thermoswitch is connected to a low voltage safety loop, wherein the safety loop is connected to a current source that generates a constant current in the safety loop, and wherein the safety loop is supervised by a current measuring device.

2. A light fixture according to claim 1, wherein the safety loop comprises at least one mechanically operated safety switch.

3. A light fixture according to claim 1, wherein the safety loop is connected to the power unit which power unit generates and supervises the constant current in the safety loop, which power unit disconnects the light source if the current in the safety loop is interrupted.

4. A light fixture according to claim 3, wherein the safety loop comprises a number of thermo switches coupled serial in the safety loop.

5. A light fixture according to claim 4, wherein the thermo switches are placed in the head in relation to the cooling of a light source.

6. A light fixture according to claim 5, whereby at least one of the thermo switches is placed heat conductively to heat sensitive components placed near or in a light path of a light fixture.

7. A light fixture according to claim 1, wherein a first part of the safety loop comprising the thermoswitches is connected to the light source in a moving head, wherein the safety loop is further connected through a power distribution module in the yoke to the power unit, wherein the power unit comprises a current generator, and a current supervision circuit, and wherein the power unit disconnects the power to the light source if the current in the safety loop is interrupted.

8. A light fixture according to claim 1 wherein the electrical connection of said light source to said power unit is via an ignition circuit.

9. A method for temperature supervision of a light fixture, in which light fixture a beam of light is generated by at least one light source, said method comprises the steps of:
   detecting the temperature in which the light fixture using at least one thermo sensor,
   supervising said at least one thermo sensor is using a low voltage current loop, wherein said step of supervising said at least one thermo sensor comprises the steps of:
   generating a constant current in said low voltage current loop using a current generating device,
   supervising said current loop is using a current detection device,
   and interrupting the power supply to the light source based on said supervising of said at least one thermo sensor.

10. A method for temperature supervision of a light fixture according to claim 9, wherein said method further comprises the step of supervising at least one safety switch using said current detection device and wherein said step of interrupting the power supply to the light source is further based on said supervising of said at least one safety switch.

* * * * *